United States Patent
Yang

(10) Patent No.: US 10,027,494 B2
(45) Date of Patent: Jul. 17, 2018

(54) POE-BASED POWER SUPPLY METHOD AND PSE

(71) Applicant: Huawei Technologies Co., Ltd., Shenzhen (CN)

(72) Inventor: Chuanfeng Yang, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/362,910

(22) Filed: Nov. 29, 2016

(65) Prior Publication Data

US 2017/0155518 A1  Jun. 1, 2017

(30) Foreign Application Priority Data

Nov. 30, 2015 (CN) .......................... 2015 1 0863963

(51) Int. Cl.
*H04B 3/00* (2006.01)
*H04L 12/10* (2006.01)
*H04L 12/24* (2006.01)
*H04L 12/40* (2006.01)

(52) U.S. Cl.
CPC ........ *H04L 12/10* (2013.01); *H04L 12/40045* (2013.01); *H04L 41/0813* (2013.01)

(58) Field of Classification Search
CPC ..... H04L 41/0833; H04L 49/40; H04L 12/10; H04L 12/40045; H04L 67/125; H04L 12/413; G06F 1/266; G06F 1/26; G05F 1/10; H02J 1/14; H02J 1/06
See application file for complete search history.

(56) References Cited

U.S. PATENT DOCUMENTS

| 2008/0229120 A1 | 9/2008 | Diab |
| 2008/0252307 A1 | 10/2008 | Schindler |
| 2015/0091391 A1* | 4/2015 | Dwelley ................. 307/130 |

FOREIGN PATENT DOCUMENTS

| EP | 1936861 A1 | 6/2008 |
| WO | 2015175951 A1 | 11/2015 |

OTHER PUBLICATIONS

Foreign Communication From A Counterpart Application, European Application No. 16198964.5, Extended European Search Report dated Apr. 11, 2017, 9 pages.

* cited by examiner

*Primary Examiner* — Rahel Guarino
(74) *Attorney, Agent, or Firm* — Conley Rose, P.C.

(57) ABSTRACT

A PoE-based power supply method and PSE. The method includes: after PSE supplies power to a PD, determining, by the PSE, a line voltage drop across a network cable between the PSE and the PD; and when the line voltage drop across the network cable is greater than a line voltage drop threshold, sending, by the PSE, a first Ethernet packet to the PD, so that the PD decreases load of the PD according to instruction information instructing the PD to decrease load power consumption and included in the first Ethernet packet. This ensures that a voltage received by the PD can satisfy a power requirement of the load of the PD, and further ensures that the PD can work normally.

21 Claims, 4 Drawing Sheets

POE-BASED POWER SUPPLY METHOD AND PSE

CROSS-REFERENCE TO RELATED APPLICATIONS

This application claims priority to Chinese Patent Application number 201510863963.9 filed on Nov. 30, 2015, which is incorporated by reference.

TECHNICAL FIELD

The present disclosure relates to the field of communications technologies, and in particular, to a Power over Ethernet (PoE)-based power supply method and power sourcing equipment (PSE).

BACKGROUND

The PoE technology refers to that power is supplied to a terminal by using an Ethernet, which can effectively resolve power supply issues for terminals such as an Internet Protocol (IP) telephone, a portable device charger, a card reader, a camera, and a data collector. For these terminals, cabling of a power system is no longer an issue to be considered, and power is supplied to the devices once they are connected to a network. A PoE system includes PSE and a powered device (PD). The PSE is configured to supply power to the PD.

With the development of PoE technologies and the improvement of PoE standards, more types of devices support remote power supply, and loads of the devices are not completely the same. However, in a PoE-related standard, an output voltage of PSE is generally fixed, for example, 53.5 volts (V). When a line voltage drop is excessively large because of a relatively long network cable or a relatively high transmission power between the PSE and a PD, a voltage received by the PD cannot be satisfactory, which further affects normal working of the PD.

SUMMARY

This application provides a PoE-based power supply method and PSE, to resolve a problem that when an output voltage of PSE is a fixed value, a voltage received by a PD cannot be satisfactory because of an excessively large line voltage drop across a network cable between the PSE and the PD, which further affects normal working of the PD.

According to a first aspect, a PoE-based power supply method is provided, including: after power sourcing equipment PSE supplies power to a PD, determining, by the PSE, a line voltage drop across a network cable between the PSE and the PD; and when the line voltage drop across the network cable is greater than a line voltage drop threshold, sending, by the PSE, a first Ethernet packet to the PD, where the first Ethernet packet includes instruction information instructing the PD to decrease load power consumption.

By using the foregoing method, when a line voltage drop across a network cable between PSE and a PD is greater than a line voltage drop threshold, the PSE performs power control management for the PD to make the PD decrease load power consumption. In this way, the PD decreases its load, and a value of a required voltage is decreased. Therefore, a voltage supplied by the PSE to the PD can satisfy a power requirement of the PD, which ensures normal working of the PD and avoids occurrence of a power failure.

With reference to the first aspect, in a first possible implementation manner, the determining, by the PSE, the line voltage drop across the network cable includes: determining, by the PSE, impedance of the network cable before supplying power to the PD; determining, by the PSE, a current in the network cable after supplying power to the PD; and using a product of the current in the network cable and the impedance of the network cable as the line voltage drop across the network cable; or detecting, by the PSE, a voltage between two ends of the PD, and using a difference between an output voltage outputted by the PSE to the PD and the voltage between the two ends of the PD as the line voltage drop across the network cable; or determining, by the PSE, an output power of the PSE, load power consumption of the PD, and current in the network cable, and using a quotient of a difference between the output power of the PSE and the load power consumption of the PD divided by the current, as the line voltage drop across the network cable.

With reference to the first possible implementation manner of the first aspect, in a second possible implementation manner of the first aspect, the determining, by the PSE, impedance of the network cable includes: determining, by the PSE, a length of the network cable, and determining a network cable category of the network cable; determining, by the PSE, according to the network cable category, impedance per unit length corresponding to the network cable category; and using a product of the impedance per unit length and the length of the network cable as the impedance of the network cable; where the determining, by the PSE, a network cable category of the network cable includes: detecting, by the PSE, signal-to-noise ratios (SNRs) of the network cable under multiple output powers, and determining a first correspondence between output powers and SNRs of the network cable; and determining, by the PSE, the network cable category of the network cable according to correspondences between output powers and SNRs of various network cable categories, and the first correspondence.

With reference to any one of the first aspect and the first and second possible implementation manners of the first aspect, in a third possible implementation manner of the first aspect, the method further includes: sending, by the PSE, a first voltage impulse to the PD, and detecting a second voltage impulse received by the PD; determining, by the PSE, a network cable insertion loss of the network cable according to the first voltage impulse and the second voltage impulse; determining, by the PSE, according to a correspondence between insertion losses and temperatures, a network cable temperature corresponding to the network cable insertion loss of the network cable; and when the PSE determines that the network cable temperature is greater than a network cable temperature threshold, sending, by the PSE, a second Ethernet packet to the PD, where the second Ethernet packet includes instruction information instructing the PD to decrease load power consumption.

By using the foregoing method, the PSE may further monitor a network cable temperature in real time. When the network cable temperature reaches a network cable temperature threshold, power control management is also performed for the PD to make the PD decrease load power consumption. In this way, a value of a voltage required by the PD is decreased, ensuring that the network cable temperature is not further deteriorated, and ensuring working reliability of a network cable as well as safety of an entire PoE-based network.

With reference to any one of the first to third possible implementation manners of the first aspect, in a fourth possible implementation manner of the first aspect, before the PSE supplies power to the PD, the method further includes: detecting, by the PSE, current load power consumption of the PD, and grading the PD according to the detected current load power consumption of the PD to determine a class of the PD; determining, according to the class of the PD, maximum-load power consumption of the PD and a maximum output voltage outputted by the PSE to the PD; and determining a current overload threshold for the network cable according to the maximum-load power consumption of the PD, the impedance of the network cable, and the maximum output voltage, where the current overload threshold is used by the PSE to control power supply for the PD.

By using the foregoing method, in a process of supplying power to each PD, the PSE sets a current overload threshold according to impedance of a corresponding network cable and maximum-load power consumption of the PD. Different current overload thresholds are set for network cables having different impedance. This greatly reduces risks of an overloaded port of the PSE caused by current imbalance among network cables which further leads to power-off of a PD, ensuring working reliability of the PD.

With reference to the second possible implementation manner of the first aspect, in a fifth possible implementation manner of the first aspect, before the PSE sends the first Ethernet packet to the PD, the method further includes: determining, by the PSE, a current change rate of the network cable, where the current change rate is used to indicate a change rate threshold of load power consumption of the PD; and accordingly, the first Ethernet packet further includes the current change rate of the network cable; where the determining, by the PSE, a current change rate of the network cable specifically includes: determining, by the PSE, maximum communication bandwidth corresponding to the network cable category of the network cable; determining, by the PSE, a noise voltage threshold of the network cable according to a port rate of the PSE, the maximum communication bandwidth, and the output voltage outputted by the PSE to the PD; after the PSE outputs the voltage to the PD, adjusting, by the PSE, a voltage value of the output voltage according to a specified unit time, and measuring a noise voltage of the network cable after each voltage adjustment, till a measured noise voltage of the network cable is equal to the noise voltage threshold; and determining, by the PSE, a current change rate of the network cable within the specified unit time in a last adjustment process.

By using the foregoing method, before instructing the PD to decrease load power consumption, the PSE determines a current change rate of the network cable, that is, a change rate threshold of load power consumption of the PD, and sends the current change rate of the network cable to the PD by using the first Ethernet packet, so that when the PD adjusts load power consumption, an actual change rate of load power consumption is less than the change rate threshold of load power consumption. This ensures that a link rate is equal to a port rate of the PSE, and that no service packet loss occurs during data transmission between the PSE and the PD, thereby ensuring transmission reliability of a link.

With reference to the fifth possible implementation manner of the first aspect, in a sixth possible implementation manner of the first aspect, the noise voltage threshold makes the following formula hold true:

$$U_N = \frac{U_O}{\sqrt{2^{\frac{C}{W}} - 1}},$$

where $U_N$ is the noise voltage threshold, $U_O$ is the output voltage outputted by the PSE to the PD, C is the port rate of the PSE, and W is the maximum communication bandwidth.

According to a second aspect, a PSE is provided, where the PSE implements functions of the PSE actions in the foregoing PoE-based power supply method, and the functions may be implemented by hardware, or may be implemented by means of corresponding software executed by hardware, where the hardware or software includes one or more modules corresponding to the foregoing functions.

In a possible implementation manner, the PSE includes a PSE chip, a processor, a bus, and an interface, where the PSE chip, the processor, and the interface are mutually connected by using the bus; the PSE chip is configured to supply power to a PD; the processor is configured to: after the PSE chip supplies power to the PD, determine a line voltage drop across a network cable between the PSE and the PD; and when the line voltage drop across the network cable is greater than a line voltage drop threshold, send a first Ethernet packet to the PD by using the interface, where the first Ethernet packet includes instruction information instructing the PD to decrease load power consumption; and the interface is configured to send the first Ethernet packet to the PD.

In another possible implementation manner, the PSE includes: a power supply unit configured to supply power to a PD, where the PD is connected to the PSE by using a network cable; a processing unit configured to: after the power supply unit supplies power to the PD, determine a line voltage drop across the network cable between the PSE and the PD; and a sending unit configured to: when the line voltage drop across the network cable is greater than a line voltage drop threshold, send a first Ethernet packet to the PD, where the first Ethernet packet includes instruction information instructing the PD to decrease load power consumption.

According to a third aspect, a PoE-based power supply system is provided, where the system includes the PSE and the PD described in the foregoing aspects, and the PSE is connected to the PD by using a network cable and supplies power to the PD; the PSE is configured to: after supplying power to the PD, determine a line voltage drop across the network cable between the PSE and the PD; and when the line voltage drop across the network cable is greater than a line voltage drop threshold, send a first Ethernet packet to the PD, where the first Ethernet packet includes instruction information instructing the PD to decrease load power consumption; and the PD is configured to accept the power supplied by the PSE; when the line voltage drop across the network cable between the PSE and the PD is greater than the line voltage drop threshold, receive the first Ethernet packet sent by the PSE; and decrease load power consumption according to the instruction information in the first Ethernet packet.

By using the PoE-based power supply method provided in the present disclosure, after PSE outputs a voltage to a PD, the PSE determines a line voltage drop across a network cable between the PSE and the PD, and when the line voltage drop across the network cable is greater than a line voltage drop threshold, the PSE sends a first Ethernet packet to the PD, where the first Ethernet packet includes instruction information instructing the PD to decrease load power consumption. In this way, the PSE can perform power control management for the PD. After receiving the first Ethernet packet, the PD may decrease load of the PD according to the instruction information instructing the PD to decrease load power consumption, where the instruction information is included in the first Ethernet packet. This ensures that a voltage received by the PD can satisfy a power requirement of the load of the PD, and further ensures that the PD can work normally.

DESCRIPTION OF EMBODIMENTS

To make the objectives, technical solutions, and advantages of the present disclosure clearer, the following further describes the present disclosure in detail with reference to the accompanying drawings. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a PoE-based power supply method and PSE, to resolve a problem when an output voltage of PSE is fixed, a voltage received by a PD cannot be satisfactory because a line voltage drop across a network cable between the PSE and the PD is excessively large, which affects normal working of the PD. The method and the apparatus of the present disclosure are based on a same inventive concept. The method and the apparatus resolve a problem by using similar principles. Therefore, mutual reference may be made for implementation of the apparatus and the method, and what is the same for both is not repeatedly described.

In the embodiments of the present disclosure, after PSE outputs a voltage to a PD, the PSE determines a line voltage drop across a network cable between the PSE and the PD; and when the line voltage drop across the network cable is greater than a line voltage drop threshold, the PSE sends a first Ethernet packet to the PD, so that after receiving the first Ethernet packet, the PD decreases load of the PD according to instruction information instructing the PD to decrease load power consumption, where the instruction information is carried in the first Ethernet packet. This ensures that a voltage received by the PD can satisfy a power requirement of the load of the PD, and further ensures that the PD can work normally.

Figure 1:
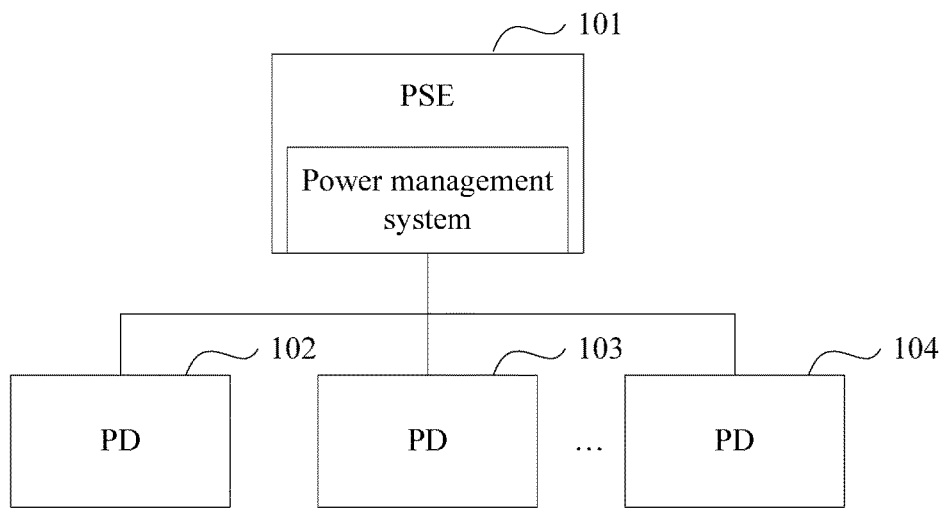
FIG. 1 is a schematic diagram of a PoE-based power supply system according to an embodiment of the present disclosure.

The PoE-based power supply method provided in the embodiments of the present is applicable to a network using a PoE technology. This application provides a PoE-based power supply system. The system includes PSE 101 and a PD. As shown in FIG. 1, for example, three PDs (a PD 102, a PD 103, and a PD 104) are connected to the PSE 101. Certainly, a terminal (not shown in the figure) other than a powered device may also be connected to the PSE 101. This application imposes no limitation thereon.

The PSE 101 is a network device for implementing data forwarding on an Ethernet, and may be a PoE-enabled Ethernet switch, router, or another network device. The present disclosure imposes no limitation thereon.

The PSE 101 includes a power source management system, and is separately connected to the PD 102, the PD 103, and the PD 104 by using standard network cables. The standard network cables include a category 5 cable (CAT5), a category 5 enhanced cable, a category 6 cable (CAT6), and the like. The PSE 101 transmits a current to each PD by using the network cable to provide a voltage to the PD, so that the PD works normally, and also exchanges data with each PD by using the network cable.

The PSE 101 may further implement power planning and management. After outputting a voltage to each PD, the PSE 101 determines a line voltage drop across a network cable between the PSE 101 and the PD. When a line voltage drop across a network cable between the PSE 101 and any PD is greater than a specified line voltage drop threshold, the PSE 101 sends, to the PD, a first Ethernet packet that carries instruction information instructing the PD to decrease load power consumption, to make the PD decrease load power consumption. For example, when there is an internal functional module or service module that is idle or undergoes no data transmission, the PD shuts down a power source for the module.

The PD 102, the PD 103, or the PD 104 may be a terminal device such as an IP telephone, a portable device charger, a card reader, or a camera. The PD 102, the PD 103, or the PD 104 accepts power supplied by the PSE 101, and when receiving a first Ethernet packet sent by the PSE, decreases load power consumption according to the instruction information in the first Ethernet packet.

Figure 2:
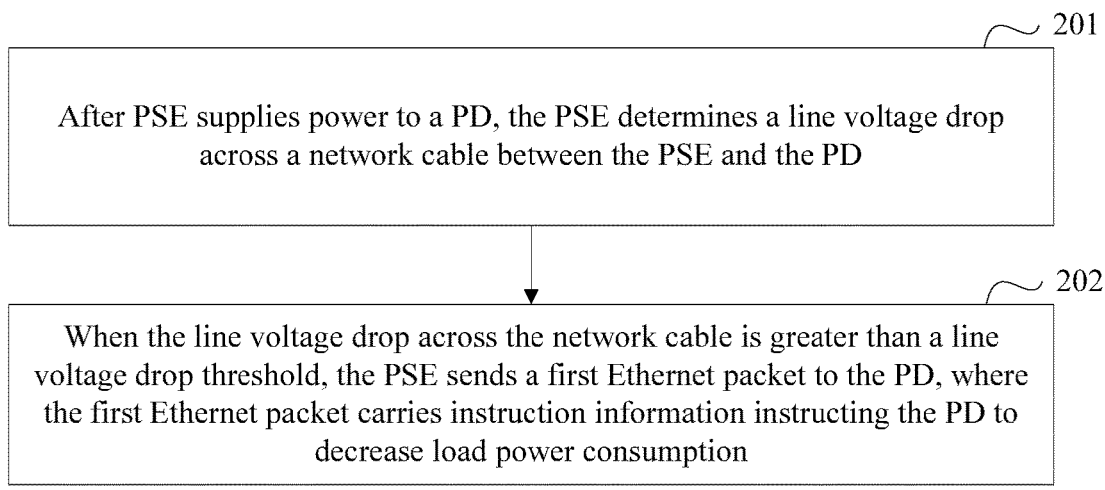
FIG. 2 is a flowchart of a PoE-based power supply method according to an embodiment of the present disclosure.

Referring to FIG. 2, FIG. 2 is a flowchart of a PoE-based power supply method according to an embodiment of the present disclosure. The method includes:

Step 201: After PSE supplies power to a PD, the PSE determines a line voltage drop across a network cable between the PSE and the PD.

Optionally, when the PSE performs step 201, the following several manners are included:

First manner: the PSE detects a voltage between two ends of the PD, and uses a difference between an output voltage outputted by the PSE to the PD and the voltage between the two ends of the PD as the line voltage drop across the network cable.

Second manner: the PSE uses a product of current in the network cable and impedance of the network cable as the line voltage drop across the network cable.

Specifically, the PSE determines the impedance of the network cable before supplying power to the PD, and determines the current in the network cable after supplying power to the PD.

Third manner: the PSE determines an output power of the PSE, load power consumption of the PD, and current in the network cable, and uses a quotient of a difference between the output power of the PSE and the load power consumption of the PD divided by the current, as the line voltage drop across the network cable.

In the first manner, the PSE can determine the output voltage Uo outputted by the PSE to the PD, and can detect the voltage Us between the two ends of the PD in a conventional manner. Then, the line voltage drop UR of the network cable makes a formula 1 hold true:

$$U_R = U_O - U_S \qquad \text{Formula 1}$$

In the second manner, the PSE determines the impedance R of the network cable before outputting a voltage to the PD, and determines the current I of the network cable after outputting the voltage. Then, the line voltage drop UR of the network cable makes a formula 2 hold true:

$$U_R = R*I \qquad \text{Formula 2}$$

In the third manner, the PSE determines the output power PO of the PSE, the load power consumption PS of the PD, and the current I of the network cable. Then, the line voltage drop UR of the network cable makes a formula 3 hold true:

$$U_R = \frac{P_O - P_S}{I} \qquad \text{Formula 3}$$

In the second manner, the determining, by the PSE, the impedance of the network cable includes the following steps: determining, by the PSE, a length of the network cable, and determining a network cable category of the network cable; determining, by the PSE, according to the network cable category, impedance per unit length corresponding to the network cable category; and using a product of the impedance per unit length and the length of the network cable as the impedance of the network cable, where the impedance R of the network cable makes a formula 4 hold true:

$$R = r0*L \qquad \text{Formula 4}$$

where r0 is the impedance per unit length corresponding to the network cable category, and L is the length of the network cable.

The PSE supplies the voltage to the PD only by using one pair of wires in the network cable. Therefore, in the foregoing step, the impedance, obtained by means of calculation, of the network cable is impedance of the one pair of wires in the network cable. In this embodiment of the present disclosure, the impedance of the network cable is impedance of one pair of wires used to supply the voltage to the PD in the network cable.

Conventional network cables are classified into multiple network cable categories, for example, a CAT5, a category 5 enhanced cable, and a CAT6. Each category is further classified into an unshielded twisted pair (UTP) and a shielded twisted pair (STP). Network cable materials may be different for different network cable categories. Impedance per unit length corresponding to a different network cable material is different. Therefore, each network cable category has its corresponding impedance per unit length.

Optionally, when determining the length of the network cable, the PSE may use a virtual cable test (VCT) function to automatically detect that the length of the network cable is L.

Optionally, the determining, by the PSE, a network cable category of the network cable includes: detecting, by the PSE, SNRs of the network cable under multiple output powers, and determining a first correspondence between output powers and SNRs of the network cable; and determining, by the PSE, the network cable category of the network cable according to correspondences between output powers and SNRs of various network cable categories, and the first correspondence.

Figure 3:
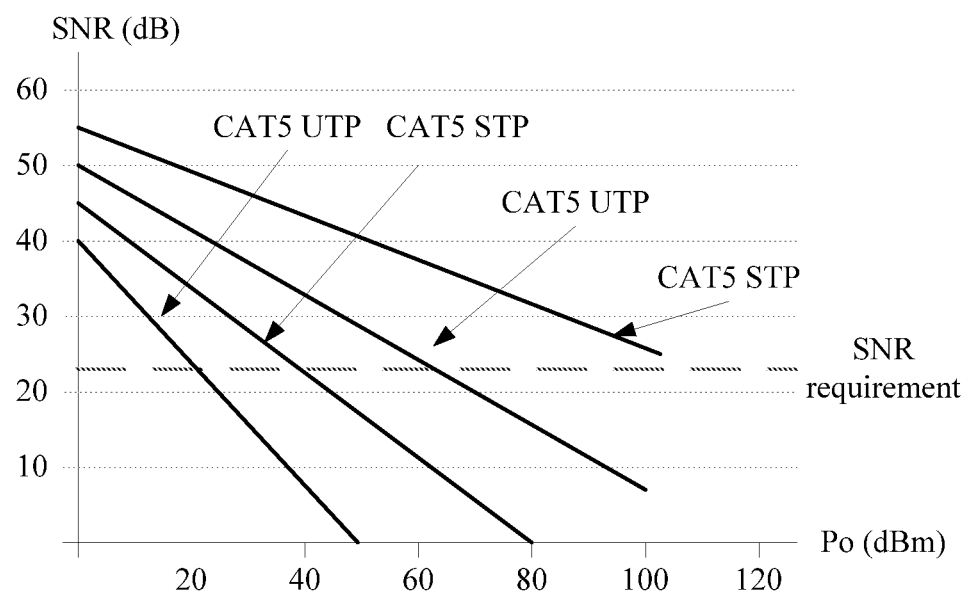
FIG. 3 shows correspondences between output powers and SNRs of various network cable categories according to an embodiment of the present disclosure.

The correspondences between output powers and SNRs of the various network cable categories are shown in FIG. 3. FIG. 3 shows correspondences between output powers and SNRs of various network cable categories in a condition that a network cable length stays unchanged. Each line in the figure represents a correspondence between output powers and SNRs of one network cable category. A correspondence between output powers and SNRs of each network cable category may also be represented by using a slope of an oblique line corresponding to the network cable category. The present disclosure imposes no limitation thereon.

Step 202: When the line voltage drop across the network cable is greater than a line voltage drop threshold, the PSE sends a first Ethernet packet to the PD, where the first Ethernet packet includes instruction information instructing the PD to decrease load power consumption.

The instruction information may be an indicator; or may be a flag in the first Ethernet packet, where the flag has been assigned a value by the PSE; or may be other data included in the first Ethernet packet. The instruction information is used to instruct the PD how to decrease load power consumption, for example, to shut down a specified functional module or service module. Optionally, the first Ethernet packet may further include cause information for instructing the PD to decrease load power consumption, that is, information notifying the PD that the line voltage drop across the network cable is greater than the line voltage drop threshold.

In the PoE standard, a voltage outputted by PSE to any PD is fixed, for example, 53.5V. Generally, when a voltage between two ends of a PD is less than 42.5V, the PD cannot work normally. Therefore, a line voltage drop across a network cable between the PSE and the PD should be less than a difference between the fixed value and 42.5V. For example, when the voltage outputted by the PSE to the PD is 53.5V, in step 202, the line voltage drop threshold may be set to 11V.

By using the foregoing steps, when a line voltage drop across a network cable between PSE and a PD is greater than a line voltage drop threshold, the PSE performs power control management for the PD. That is, the PSE sends, to the PD, a first Ethernet packet that carries instruction information instructing the PD to decrease load power consumption, to make the PD decrease load power consumption. For example, when there is an internal functional module or service module that is idle or undergoes no data transmission, the PD shuts down a power source for the module. In this way, the PD decreases its load, and a value of a required voltage is decreased, so that a voltage supplied by the PSE to the PD can satisfy a power requirement of the PD, which ensures normal working of the PD and avoids occurrence of a power failure.

Optionally, the method further includes: sending, by the PSE, a first voltage impulse to the PD, and detecting a second voltage impulse received by the PD; determining, by the PSE, a network cable insertion loss of the network cable according to the first voltage impulse and the second voltage impulse; determining, by the PSE, according to a correspondence between insertion losses and temperatures, a network cable temperature corresponding to the network cable insertion loss of the network cable; and when the PSE determines that the network cable temperature is greater than a network cable temperature threshold, sending, by the PSE, a second Ethernet packet to the PD, where the second Ethernet packet includes instruction information instructing the PD to decrease load power consumption, and the network cable temperature threshold may be set according to a requirement of a residence environment or network deployment, for example, to 60 degrees Celsius.

The network cable insertion loss of the network cable makes a formula 5 hold true:

$$IL = 20lg\left(\frac{u_O}{u_S}\right) \qquad \text{Formula 5}$$

where IL is the network cable insertion loss of the network cable, $u_O$ is the first voltage impulse, and $u_S$ is the second voltage impulse, and $u_O$ and $u_S$ may be determined by using a time domain reflectometry (TDR) technology of a physical layer (PHY) of the PSE.

The correspondence between network cable insertion losses and network cable temperatures makes a formula 6 hold true:

$$IL = [1 + k(T - 20)] * \left(1.82\sqrt{f} + 0.0091f + \frac{0.25}{\sqrt{f}}\right) \qquad \text{Formula 6}$$

where T is a temperature of the network cable, k is a temperature change coefficient of the network cable, and f is a port bandwidth frequency of the PSE.

In the formula 6, the PSE may obtain f by means of auto-negotiation at the PHY. Moreover, it is known that, at an initial temperature T0 of the network cable, the network cable insertion loss of the network cable when the PD is initially powered on is IL0. The PSE can determine the temperature change coefficient k of the network cable according to f, T0, IL0, and the formula 6. Further, after the network cable insertion loss of the network cable, k, and f are determined, the network cable temperature can be determined by using the formula 6.

Optionally, the second Ethernet packet and the first Ethernet packet may be a same Ethernet packet or different Ethernet packets. Optionally, the second Ethernet packet may further include cause information for instructing the PD to decrease load power consumption, that is, information notifying the PD that the network cable temperature is greater than the network cable temperature threshold. When the first Ethernet packet or the second Ethernet packet includes the cause information for instructing the PD to decrease load power consumption, the first Ethernet packet and the second Ethernet packet are different. Optionally, when the PSE determines that the line voltage drop is greater than the line voltage drop threshold and determines that the network cable temperature is greater than the network cable temperature threshold, the PSE may send both the first Ethernet packet and the second Ethernet packet, or directly send either of the two, or combine the first Ethernet packet and the second Ethernet packet into one Ethernet packet for sending. The present disclosure imposes no limitation thereon.

When the network cable temperature is excessively high, line instability is likely to result, which deteriorates network cable performance. It is specified in a standard that a highest working temperature of a network cable is 60 degrees Celsius. When the PSE supplies a voltage to the PD by using a network cable, the network cable is very likely to become hot because of a relatively high load of the PD or relatively high current in the network cable. However, in a conventional PoE-based network, a temperature of a network cable is not monitored in real time. As a result, working reliability of the network cable is decreased and a safety threat exists in the network.

In the foregoing manner, the PSE monitors a network cable temperature in real time. In addition, when the network cable temperature reaches a specified network cable temperature threshold, the PSE also performs power control management for the PD, that is, the PSE sends, to the PD, a second Ethernet packet that carries instruction information instructing the PD to decrease load power consumption, to make the PD decrease load power consumption. For example, for a functional module or service module that is idle or undergoes no data transmission inside the PD, the PD shuts down a power source of the module, thereby decreasing load power consumption. In this way, a voltage required by the PD is decreased, and it is ensured that the network cable temperature is not further deteriorated, ensuring working reliability of a network cable and safety of an entire network.

Optionally, before the PSE outputs the voltage to the PD, the method further includes: detecting, by the PSE, current load power consumption of the PD, and perform classification to the PD according to the detected current load power consumption of the PD to determine a class of the PD; determining, according to the class of the PD, maximum-load power consumption of the PD and a maximum output voltage outputted by the PSE to the PD; and determining a current overload threshold for the network cable according to the maximum-load power consumption of the PD, the impedance of the network cable, and the maximum output voltage, where the current overload threshold is used by the PSE to control power supply for the PD.

For example, after the PSE outputs the voltage to the PD, the PSE determines the current in the network cable. When the current in the network cable is greater than or equal to the current overload threshold, the PSE shuts down power supply to the PD.

In conventional PoE standards, a connected PD is classed according to load power consumption of the PD. Corresponding parameters such as an output power of the PSE, maximum-load power consumption of a PD, and an output voltage range are set for each class.

The determining a current overload threshold for the network cable according to the maximum-load power consumption of the PD, the impedance of the network cable, and the maximum output voltage includes:

Determining, by the PSE, by using a formula 7 and according to the maximum-load power consumption of the PD, the impedance of the network cable, and the maximum output voltage, a voltage between two ends of the PD under the maximum-load power consumption of the PD:

$$\frac{P_{Smax}}{U_S} = \frac{U_{Omax} - U_S}{R} \qquad \text{Formula 7}$$

where $P_{Smax}$ is the maximum-load power consumption of the PD, $U_{Omax}$ is the maximum output voltage outputted by the PSE to the PD under the maximum-load power consumption of the PD, R is the impedance of the network cable, and $U_S$ is the voltage between the two ends of the PD under the maximum-load power consumption of the PD; determining, by the PSE, by using a formula 8 and according to the voltage between the two ends of the PD under the maximum-load power consumption of the PD, and the maximum-load power consumption of the PD, current in the network cable under the maximum-load power consumption of the PD:

$$I_{max} = \frac{P_{Smax}}{U_S} \qquad \text{Formula 8}$$

and determining, by the PSE, the current overload threshold $I_{cut}$ of the network cable according to $I_{max}$, the current in the network cable under the maximum-load power consumption of the PD, where $I_{cut} > I_{max}$.

In a conventional PoE-based network, after PSE classes a PD according to a load power of the PD, a same current overload threshold is set for network cables between the PSE and all PDs. In this way, the PSE cannot consider a line loss or a problem of current imbalance among the network cables in a case of high-power power supply. As a result, a voltage supplied by the PSE to a PD cannot satisfy a load requirement of the PD, and the PD is possible to be powered off.

In the foregoing manner, in a process of supplying power to each PD, the PSE sets a current overload threshold according to impedance of each network cable and maximum-load power consumption of the PD. Different current overload thresholds are set for network cables having different impedance. This greatly reduces risks of an overloaded port of the PSE caused by current imbalance among network cables which further leads to power-off of a PD, ensuring working reliability of the PD.

Optionally, in the foregoing embodiment, before the PSE sends the first Ethernet packet to the PD, the method further includes: determining, by the PSE, a current change rate of the network cable, where the current change rate is used to indicate a change rate threshold of load power of the PD; and accordingly, the first Ethernet packet sent by the PSE to the PD in step 202 further includes the current change rate of the network cable. Optionally, the second Ethernet packet sent by the PSE to the PD may also include the current change rate of the network cable.

Optionally, the determining, by the PSE, a current change rate of the network cable specifically includes: determining, by the PSE, maximum communication bandwidth corresponding to the network cable category of the network cable; determining, by the PSE, a noise voltage threshold of the network cable according to a port rate of the PSE, the maximum communication bandwidth, and the output voltage outputted by the PSE to the PD; after the PSE outputs the voltage to the PD, adjusting, by the PSE, a voltage value of the output voltage according to a specified unit time, and measuring a noise voltage of the network cable after each voltage adjustment, till a measured noise voltage of the network cable is equal to the noise voltage threshold; and determining, by the PSE, a current change rate of the network cable within the specified unit time in a last adjustment process.

The current change rate is a change rate threshold of load power consumption of the PD within the unit time.

After step 202, after receiving the first Ethernet packet that carries the instruction information instructing the PD to decrease load power consumption, the PD decreases load power consumption of the PD according to the instruction information. However, when the load of the PD changes, noise on a link between the PSE and the PD changes accordingly, resulting in a decreased signal-to-noise ratio. It can be known according to the Shannon formula (formula 9) that, when the signal-to-noise ratio is decreased, a rate of the link is also decreased. Moreover, in a process in which the PD decreases its load power consumption, an excessively high change rate of load power consumption of the PD within a unit time may result in a fact that the link rate is less than the port rate of the PSE, which further results in a service packet loss and affects working efficiency of the PSE and the PD. Therefore, in the process in which the PD decreases its load, it needs to be ensured that the change rate of load power consumption within a unit time is within such a range that no service packet loss occurs on the link.

$$C = W * \log_2\left(1 + \frac{S}{N}\right) \quad \text{Formula 9}$$

where C is the link rate, W is the maximum communication bandwidth corresponding to the network cable category of the network cable, S is an average signal power, and N is an average noise power.

The SNR may be represented by using a formula 10 or a formula 11:

$$SNR = 20 * lg\left(\frac{U_O}{U_N}\right) \quad \text{Formula 10}$$

where $U_O$ is the output voltage outputted by the PSE to the PD, and $U_N$ is the noise voltage of the network cable; and $$SNR = 10 * lg\left(\frac{S}{N}\right) \quad \text{Formula 11}$$

Therefore, a formula 12 may be obtained according to the formula 10 and the formula 11.

$$\frac{S}{N} = \left(\frac{U_O}{U_N}\right)^2 \quad \text{Formula 12}$$

When it is ensured that the port rate of the PSE is equal to the link rate, the noise voltage threshold may be obtained according to the formula 12 and the formula 9, and the following formula 13 holds true:

$$U_N = \frac{U_O}{\sqrt{2^{\frac{C}{W}} - 1}} \quad \text{Formula 13}$$

where $U_N$ is the noise voltage threshold, $U_O$ is the output voltage outputted by the PSE to the PD, C is the port rate of the PSE, and W is the maximum communication bandwidth.

When the PSE detects that the noise voltage of the network cable is equal to the noise voltage threshold, the obtained current change rate within the specified unit time is a change rate at which the PD adjusts load power consumption within the specified unit time. Therefore, only by ensuring that a change rate of load power consumption within a unit time is less than the current change rate during load power consumption adjustment, can the PD ensure that the link rate is equal to the port rate of the PSE, and that no service packet loss occurs during data transmission between the PSE and the PD, thereby ensuring transmission reliability of the link.

By using the PoE-based power supply method in the foregoing embodiment of the present disclosure, when a line voltage drop between PSE and a PD is greater than a line voltage drop threshold, the PSE performs power control management for the PD to make the PD decrease load power consumption. In this way, the PD decreases its load, and a value of a required voltage is decreased, so that a voltage supplied by the PSE to the PD can satisfy a power requirement of the PD, which ensures normal working of the PD and avoids occurrence of a power failure.

The PSE may further monitor a network cable temperature in real time. When the network cable temperature reaches a network cable temperature threshold, power control management is also performed for the PD to make the PD decrease load power consumption. In this way, a value of a voltage required by the PD is decreased, ensuring that the network cable temperature is not further deteriorated, and ensuring working reliability of a network cable as well as safety of an entire PoE-based network.

In a process of supplying power to each PD, the PSE sets a current overload threshold according to impedance of each network cable and maximum-load power consumption of the PD. Different current overload thresholds are set for network cables having different impedance. This greatly reduces risks of an overloaded port of the PSE caused by current imbalance among network cables which further leads to power-off of a PD, ensuring working reliability of the PD.

Before instructing the PD to decrease load power consumption, the PSE determines a change rate threshold of load power consumption of the PD, so that when the PD adjusts load power consumption, an actual change rate of load power consumption is less than the change rate threshold of load power consumption. This ensures that a link rate is equal to a port rate of the PSE, and that no service packet loss occurs during data transmission between the PSE and the PD, thereby ensuring transmission reliability of a link.

Figure 4:
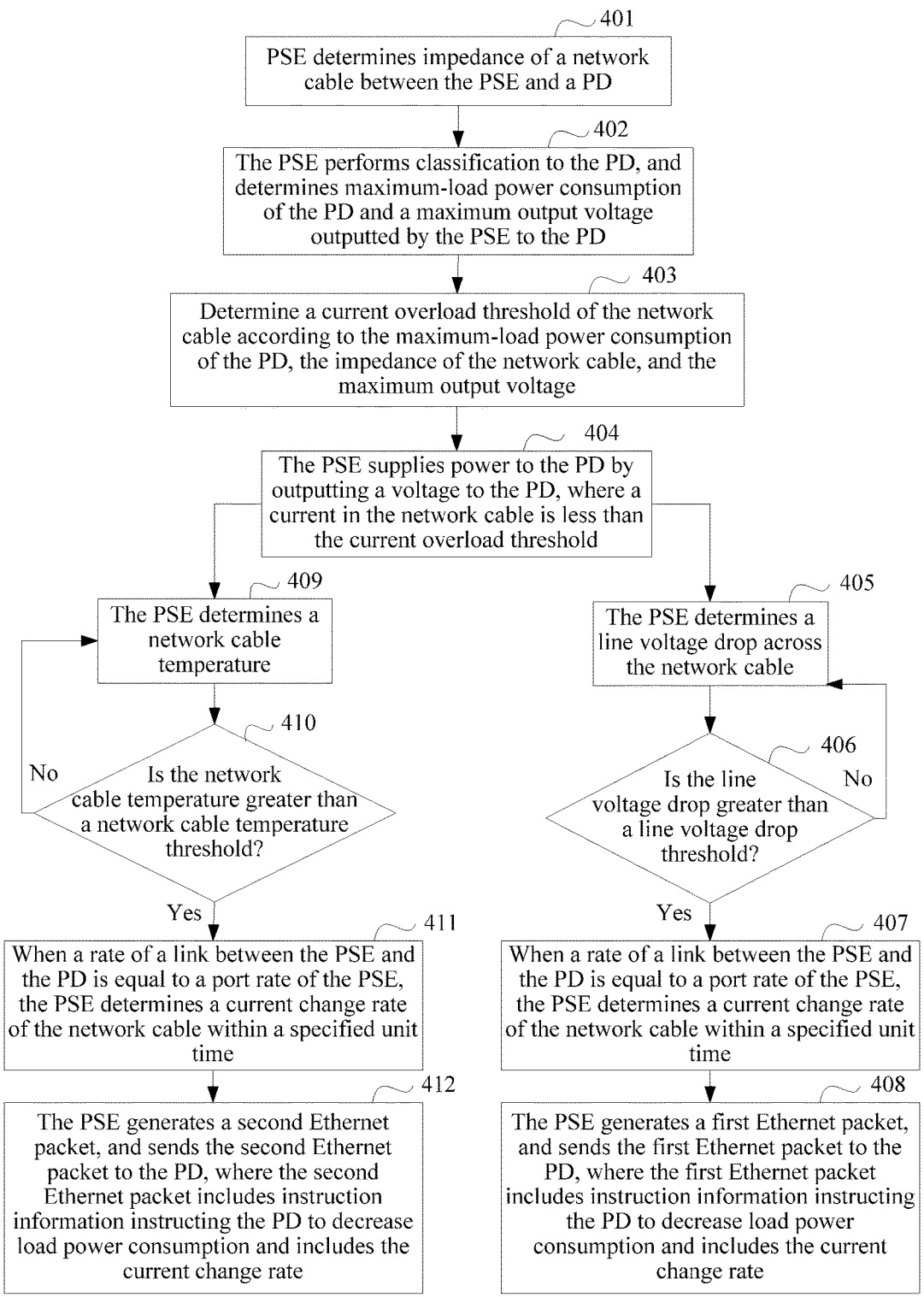
FIG. 4 is a flowchart of a PoE-based power supply method according to an embodiment of the present disclosure.

Based on the foregoing embodiment, the present disclosure further provides a PoE-based power supply method. Referring to FIG. 4, a process of the method includes:

Step 401: The PSE determines impedance of the network cable.

Optionally, the determining, by the PSE, impedance of the network cable includes the following steps: determining, by the PSE, a length of the network cable, and determining a network cable category of the network cable; determining, by the PSE, according to the network cable category, impedance per unit length corresponding to the network cable category; and using a product of the impedance per unit length and the length of the network cable as the impedance of the network cable.

Optionally, when determining the length of the network cable, the PSE may use a VCT function to automatically detect that the length of the network cable is L.

Optionally, the determining, by the PSE, a network cable category of the network cable includes: detecting, by the PSE, SNRs of the network cable under multiple output powers, and determining a first correspondence between output powers and SNRs of the network cable; and determining, by the PSE, the network cable category of the network cable according to correspondences between output powers and SNRs of various network cable categories, and the first correspondence, where the correspondences between output powers and SNRs of the various network cable categories are shown in FIG. 3.

Step 402: The PSE performs classification to the PD to determine a class of the PD, and determines, according to the class corresponding to the PD, maximum-load power consumption of the PD and a maximum output voltage outputted by the PSE to the PD.

The performing classification to the PD by the PSE is detecting current load power consumption of the PD and determining the class corresponding to the PD according to the current load power consumption of the PD.

According to the class of the PD, parameters, corresponding to the class, such as an output power of the PSE, maximum-load power consumption of the PD, and an output voltage range can be determined.

Step 403: Determine a current overload threshold for the network cable according to the maximum-load power consumption of the PD, the impedance of the network cable, and the maximum output voltage.

Optionally, the PSE may determine, by using the formula 7 and according to the maximum-load power consumption of the PD, the impedance of the network cable, and the maximum output voltage, a voltage between two ends of the PD under the maximum-load power consumption of the PD; the PSE determines, by using the formula 8 and according to the voltage between the two ends of the PD under the maximum-load power consumption of the PD, and the maximum-load power consumption of the PD, current in the network cable under the maximum-load power consumption of the PD; and the PSE determines the current overload threshold $I_{cut}$ of the network cable according to $I_{max}$, the current in the network cable under the maximum-load power consumption of the PD, where $I_{cut} > I_{max}$.

In this way, in a process of supplying power to each PD, the PSE sets a current overload threshold according to impedance of each network cable and maximum-load power consumption of the PD. Different current overload thresholds are set for network cables having different impedance. This greatly reduces risks of an overloaded port of the PSE caused by current imbalance among network cables which further leads to power-off of a PD, ensuring working reliability of the PD.

Step 404: The PSE supplies power to the PD by outputting a voltage to the PD, where current in the network cable is less than the current overload threshold.

Step 405: The PSE determines a line voltage drop across the network cable.

When step 405 is performed, the following several manners are specifically included:

First manner: the PSE detects a voltage between two ends of the PD, and uses a difference between an output voltage outputted by the PSE to the PD and the voltage between the two ends of the PD as the line voltage drop across the network cable.

Second manner: the PSE determines impedance of the network cable before outputting the voltage to the PD, determines a current in the network cable after outputting the voltage to the PD, and uses a product of the current in the network cable and the impedance of the network cable as the line voltage drop across the network cable.

Third manner: the PSE determines an output power of the PSE, load power consumption of the PD, and current in the network cable, and uses a quotient of a difference between the output power of the PSE and the load power consumption of the PD divided by the current, as the line voltage drop across the network cable.

Step 406: The PSE determines whether the line voltage drop is greater than a line voltage drop threshold; and if the line voltage drop is greater than the line voltage drop threshold, performs a process of decreasing load power consumption of the PD; if the line voltage drop is not greater than the line voltage drop threshold, continues to perform step 405.

Step 407 and step 408 are the process of decreasing load power consumption of the PD. Optionally, step 407 is performed at any time after step 404. The present disclosure imposes no limitation thereon, and only one execution manner is shown in the figure.

Step 407: When a rate of a link between the PSE and the PD is equal to a port rate of the PSE, the PSE determines a current change rate of the network cable within a specified unit time.

Optionally, when the PSE performs step 407, the following steps are included: determining, by the PSE, maximum communication bandwidth corresponding to the network cable category of the network cable; determining, by the PSE, a noise voltage threshold of the network cable according to the port rate of the PSE, the maximum communication bandwidth, and the output voltage outputted by the PSE to the PD; after the PSE outputs the voltage to the PD, adjusting, by the PSE, a voltage value of the output voltage according to the specified unit time, and measuring a noise voltage of the network cable after each voltage adjustment, till a measured noise voltage of the network cable is equal to the noise voltage threshold; and determining, by the PSE, a current change rate of the network cable within the specified unit time in a last adjustment process, where the current change rate is a change rate threshold of load power consumption of the PD within the unit time.

Step 408: The PSE generates a first Ethernet packet, and sends the first Ethernet packet to the PD, where the first Ethernet packet includes instruction information instructing the PD to decrease load power consumption and includes the current change rate.

The instruction information may be an indicator; or may be a flag in the first Ethernet packet, where the flag has been assigned a value by the PSE; or may be other data included in the first Ethernet packet. The instruction information is used to instruct the PD how to decrease load power consumption, for example, to shut down a specified functional module or service module. Optionally, the first Ethernet packet may further include cause information for instructing the PD to decrease load power consumption, that is, information notifying the PD that the line voltage drop across the network cable is greater than the line voltage drop threshold.

After step 408, the PD receives the first Ethernet packet sent by the PSE, adjusts load power consumption of the PD according to the instruction information in the first Ethernet packet, and ensures that a change rate of load power consumption within a unit time is less than the current change rate.

Step 409: The PSE determines a network cable temperature of the network cable.

When the PSE performs step 409, the following steps are included: sending, by the PSE, a first voltage impulse to the PD, and detecting a second voltage impulse received by the PD; determining, by the PSE, a network cable insertion loss of the network cable according to the first voltage impulse and the second voltage impulse; determining, by the PSE, according to a correspondence between insertion losses and temperatures, a network cable temperature corresponding to the network cable insertion loss of the network cable; and when the PSE determines that the network cable temperature is greater than a network cable temperature threshold, sending, by the PSE, a second Ethernet packet to the PD, where the second Ethernet packet includes instruction information instructing the PD to decrease load power consumption, and the network cable temperature threshold may be set according to a requirement of a residence environment or network deployment, for example, to 60 degrees Celsius.

Step 410: The PSE determines whether the network cable temperature is greater than a network cable temperature threshold; and if the network cable temperature is greater than the network cable temperature threshold, performs a process of decreasing load power consumption of the PD; if the network cable temperature is not greater than the network cable temperature threshold, continues to perform step 409.

Step 411 and step 412 are the process of decreasing load power consumption of the PD. Optionally, step 411 is performed at any time after step 404. The present disclosure imposes no limitation thereon, and only one execution manner is shown in the figure.

Step 411: When a rate of a link between the PSE and the PD is equal to a port rate of the PSE, the PSE determines a current change rate of the network cable within a specified unit time. This step is the same as step 407, and therefore is not further described herein. In a specific application scenario, the current change rate of the network cable may be calculated only once, and is stored after being determined by the PSE. When a first Ethernet packet or a second Ethernet packet needs to be sent subsequently, the stored current change rate of the network cable may be directly carried in the first Ethernet packet or the second Ethernet packet.

Step 412: The PSE generates a second Ethernet packet, and sends the second Ethernet packet to the PD, where the second Ethernet packet includes instruction information instructing the PD to decrease load power consumption and includes the current change rate.

After step 412, the PD receives the second Ethernet packet sent by the PSE, adjusts load power consumption of the PD according to the instruction information in the second Ethernet packet, and ensures that a change rate of load power consumption within a unit time is less than the current change rate.

By using the PoE-based power supply method provided in the foregoing embodiment of the present disclosure, when a line voltage drop between PSE and a PD is greater than a line voltage drop threshold, the PSE performs power control management for the PD to make the PD decrease load power consumption. In this way, the PD decreases its load, and a value of a required voltage is decreased, so that a voltage supplied by the PSE to the PD can satisfy a power requirement of the PD, which ensures normal working of the PD and avoids occurrence of a power failure.

Moreover, the PSE may further monitor a network cable temperature in real time. When the network cable temperature reaches a network cable temperature threshold, power control management is also performed for the PD to make the PD decrease load power consumption. In this way, a value of a voltage required by the PD is decreased, ensuring that the network cable temperature is not further deteriorated, and ensuring working reliability of a network cable as well as safety of an entire PoE-based network.

In a process of supplying power to each PD, the PSE sets a current overload threshold according to impedance of a corresponding network cable and maximum-load power consumption of the PD. Different current overload thresholds are set for network cables having different impedance. This greatly reduces risks of an overloaded port of the PSE caused by current imbalance among network cables which further leads to power-off of a PD, ensuring working reliability of the PD.

Before instructing the PD to decrease load power consumption, the PSE determines a change rate threshold of load power consumption of the PD, so that when the PD adjusts load power consumption, an actual change rate of load power consumption is less than the change rate threshold of load power consumption. This ensures that a link rate is equal to a port rate of the PSE, and that no service packet loss occurs during data transmission between the PSE and the PD, thereby ensuring transmission reliability of a link.

Figure 5:
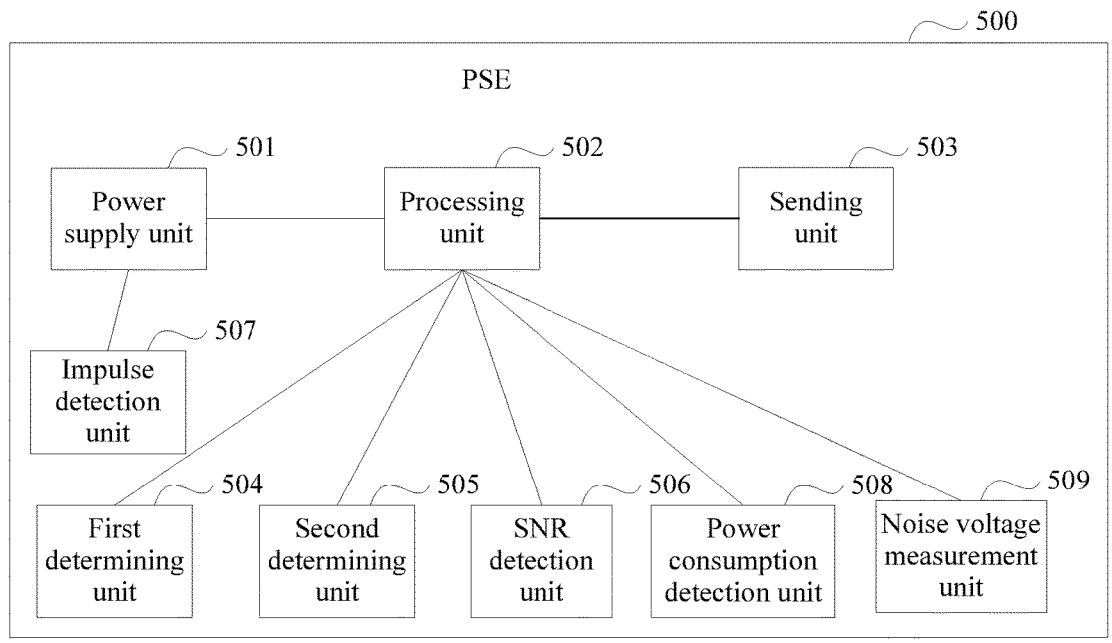
FIG. 5 is a schematic structural diagram of PSE according to an embodiment of the present disclosure.

The present disclosure further provides PSE that is configured to implement functions of the PSE in the PoE-based power supply method shown in FIG. 2 and FIG. 4. Referring to FIG. 5, the PSE 500 includes a power supply unit 501, a processing unit 502, and a sending unit 503.

The power supply unit 501 is configured to supply power to a PD, where the PD is connected to the PSE 500 by using a network cable.

The processing unit 502 is configured to: after the power supply unit 501 supplies power to the PD, determine a line voltage drop across the network cable between the PSE 500 and the PD.

The sending unit 503 is configured to: when the line voltage drop across the network cable is greater than a line voltage drop threshold, send a first Ethernet packet to the PD, where the first Ethernet packet includes instruction information instructing the PD to decrease load power consumption.

Optionally, the PSE 500 further includes a first determining unit 504 configured to: after the power supply unit 501 supplies power to the PD, determine a current in the network cable; and when determining the line voltage drop across the network cable, the processing unit 502 is specifically configured to: determine impedance of the network cable before the power supply unit 501 supplies power to the PD; and use a product of the current in the network cable and the impedance of the network cable as the line voltage drop across the network cable.

Optionally, when determining the impedance of the network cable, the processing unit 502 is specifically configured to: determine a network cable category of the network cable; determine, according to the network cable category, impedance per unit length corresponding to the network cable category; and use a product of the impedance per unit length and a length of the network cable as the impedance of the network cable.

The PSE 500 further includes a second determining unit 505 configured to determine the length of the network cable.

When determining the network cable category of the network cable, the processing unit 502 is specifically configured to: determine a first correspondence between output powers and SNRs of the network cable according to SNRs of the network cable under multiple output powers; and determine the network cable category of the network cable according to correspondences between output powers and SNRs of various network cable categories, and the first correspondence.

The PSE 500 further includes an SNR detection unit 506 configured to detect and obtain the SNRs of the network cable under the multiple output powers.

Optionally, the PSE 500 further includes an impulse detection unit 507, where the impulse detection unit 507 is configured to send a first voltage impulse to the PD and detect a second voltage impulse received by the PD; the processing unit 502 is further configured to determine a network cable insertion loss of the network cable according to the first voltage impulse and the second voltage impulse, and determine, according to a correspondence between insertion losses and temperatures, a network cable temperature corresponding to the network cable insertion loss of the network cable; and the sending unit 503 is further configured to: when the network cable temperature is greater than a specified network cable temperature threshold, send a second Ethernet packet to the PD, where the second Ethernet packet includes instruction information instructing the PD to decrease load power consumption.

Optionally, the PSE 500 further includes a power consumption detection unit 508 configured to detect current load power consumption of the PD. Specifically, the power consumption detection unit 508 detects the current load power consumption of the PD before the power supply unit 501 supplies power to the PD.

The processing unit 502 is further configured to class the PD according to the current load power consumption of the PD detected by the power consumption detection unit 508 to determine a class of the PD; determine, according to the class of the PD, maximum-load power consumption of the PD and a maximum output voltage outputted to the PD; and determine a current overload threshold for the network cable according to the maximum-load power consumption of the PD, the impedance of the network cable, and the maximum output voltage, where the current overload threshold is used by the PSE to control power supply for the PD.

Optionally, the processing unit 502 is further configured to determine a current change rate of the network cable, where the current change rate is used to indicate a change rate threshold of load power consumption of the PD. Specifically, the processing unit 502 determines the current change rate of the network cable before the sending unit 503 sends the first Ethernet packet to the PD.

Accordingly, the first Ethernet packet further includes the current change rate of the network cable.

When determining the current change rate of the network cable, the processing unit 502 is specifically configured to: determine maximum communication bandwidth corresponding to the network cable category of the network cable; and determine a noise voltage threshold of the network cable according to a port rate of the PSE 500, the maximum communication bandwidth, and an output voltage outputted by the power supply unit 501 to the PD.

The power supply unit 501 is further configured to: after outputting the voltage to the PD, adjust a voltage value of the output voltage according to a specified unit time, till a measured noise voltage of the network cable is equal to the noise voltage threshold, where the PSE 500 further includes a noise voltage measurement unit 509 configured to measure a noise voltage of the network cable after the power supply unit 501 adjusts a voltage each time.

The processing unit 502 determines a current change rate of the network cable within the specified unit time in a last adjustment process.

Optionally, the noise voltage threshold makes the following formula hold true:

$$U_N = \frac{U_O}{\sqrt{2^{\frac{C}{W}} - 1}}$$

where $U_N$ is the noise voltage threshold, $U_O$ is the output voltage outputted by the power supply unit 501 to the PD, C is the port rate of the PSE 500, and W is the maximum communication bandwidth.

By using the PSE provided in this embodiment of the present disclosure, when a line voltage drop between the PSE and a PD is greater than a line voltage drop threshold, the PSE performs power control management for the PD to make the PD decrease load power consumption. In this way, the PD decreases its load, and a value of a required voltage is decreased, so that a voltage supplied by the PSE to the PD can satisfy a power requirement of the PD, which ensures normal working of the PD and avoids occurrence of a power failure.

The PSE may further monitor a network cable temperature in real time. When the network cable temperature reaches a network cable temperature threshold, power control management is also performed for the PD to make the PD decrease load power consumption. In this way, a value of a voltage required by the PD is decreased, ensuring that the network cable temperature is not further deteriorated, and ensuring working reliability of a network cable as well as safety of an entire PoE-based network.

In a process of supplying power to each PD, the PSE sets a current overload threshold according to impedance of each network cable and maximum-load power consumption of the PD. Different current overload thresholds are set for network cables having different impedance. This greatly reduces risks of an overloaded port of the PSE caused by current imbalance among network cables which further leads to power-off of a PD, ensuring working reliability of the PD.

Before instructing the PD to decrease load power consumption, the PSE determines a change rate threshold of load power consumption of the PD, so that when the PD adjusts load power consumption, an actual change rate of load power consumption is less than the change rate threshold of load power consumption. This ensures that a link rate is equal to a port rate of the PSE, and that no service packet loss occurs during data transmission between the PSE and the PD, thereby ensuring transmission reliability of a link.

It should be noted that the unit division in the embodiments of the present disclosure is exemplary, and is merely logical function division and may be other division in actual implementation. Functional units in the embodiments of this application may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially or all or a part of the technical solutions may be implemented in a form of a software product. The computer software product is stored in a storage medium and includes several instructions for instructing a computer device (which may be a personal computer, a server, a network device, or the like) or a processor to perform all or a part of the steps of the methods described in the embodiments of this application. The foregoing storage medium includes: any medium that can store program code, such as a USB flash drive, a removable hard disk, a read-only memory (ROM), a random-access memory (RAM), a magnetic disk, or an optical disc.

Figure 6:
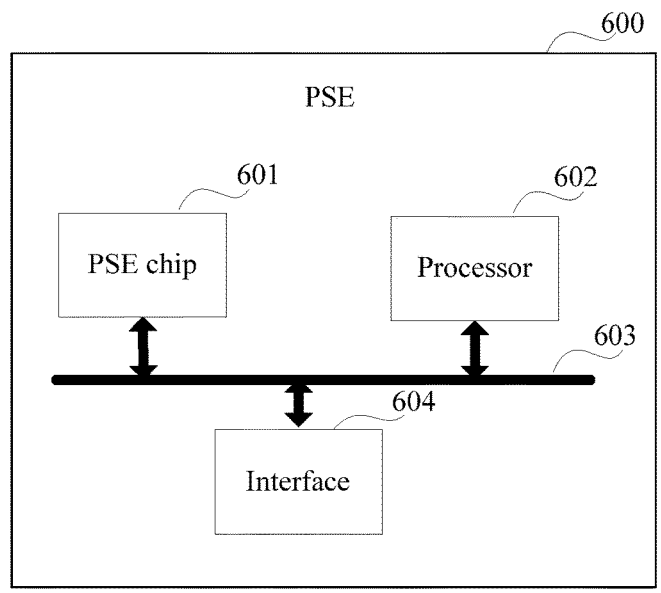
FIG. 6 is a schematic structural diagram of PSE according to an embodiment of the present disclosure.

The present disclosure further provides PSE that is configured to implement functions of the PSE in the PoE-based power supply method shown in FIG. 2 and FIG. 4. Referring to FIG. 6, the PSE 600 includes a PSE chip 601, a processor 602, a bus 603, and an interface 604.

The PSE chip 601, the processor 602, and the interface 604 are mutually connected by using the bus 603. The bus 603 may be a peripheral component interconnect (PCI) bus, an extended industry standard architecture (EISA) bus, or the like. The bus may be classified into an address bus, a data bus, a control bus, and the like. For ease of representation, the bus is represented by using only one bold line in FIG. 6, which, however, does not mean that there is only one bus or only one type of bus.

A PD is connected to the interface 604 by using a network cable. The PSE 600 communicates with the PD by using the interface 604, and supplies electric power to the PD.

The PSE chip 601 is configured to supply power to the PD.

The processor 602 is configured to: after the PSE chip 601 supplies power to the PD, determine a line voltage drop across the network cable between the PSE 600 and the PD; and when the line voltage drop across the network cable is greater than a line voltage drop threshold, send a first Ethernet packet to the PD by using the interface 604, where the first Ethernet packet includes instruction information instructing the PD to decrease load power consumption.

Optionally, the PSE chip 601 is further configured to: after supplying power to the PD, determine a current in the network cable; and when determining the line voltage drop across the network cable, the processor 602 is specifically configured to: determine impedance of the network cable before the PSE chip 601 supplies power to the PD; and use a product of the current in the network cable and the impedance of the network cable as the line voltage drop across the network cable.

Optionally, when determining the impedance of the network cable, the processor 602 is specifically configured to: determine a network cable category of the network cable; determine, according to the network cable category, impedance per unit length corresponding to the network cable category; and use a product of the impedance per unit length and a length of the network cable as the impedance of the network cable; and the PSE chip 601 is further configured to determine the length of the network cable.

When determining the network cable category of the network cable, the processor 602 is specifically configured to: determine a first correspondence between output powers and signal-to-noise ratios SNR of the network cable according to SNRs of the network cable under multiple output powers; and determine the network cable category of the network cable according to correspondences between output powers and SNRs of various network cable categories, and the first correspondence; and the PSE chip 601 is further configured to detect and obtain the SNRs of the network cable under the multiple output powers.

Optionally, the PSE chip 601 is further configured to send a first voltage impulse to the PD, and detect a second voltage impulse received by the PD; and the processor 602 is further configured to determine a network cable insertion loss of the network cable according to the first voltage impulse and the second voltage impulse; determine, according to a correspondence between insertion losses and temperatures, a network cable temperature corresponding to the network cable insertion loss of the network cable; and when determining that the network cable temperature is greater than a network cable temperature threshold, send a second Ethernet packet to the PD, where the second Ethernet packet includes instruction information instructing the PD to decrease load power consumption.

Optionally, the PSE chip 601 is further configured to: before the PSE chip 601 supplies power to the PD, detect current load power consumption of the PD; and the processor 602 is further configured to class the PD according to the current load power consumption of the PD detected by the PSE chip 601 to determine a class of the PD; determine, according to the class of the PD, maximum-load power consumption of the PD and a maximum output voltage outputted by the PSE chip 601 to the PD; and determine a current overload threshold for the network cable according to the maximum-load power consumption of the PD, the impedance of the network cable, and the maximum output voltage, where the current overload threshold is used by the PSE 600 to control power supply for the PD.

Optionally, the processor 602 is further configured to: before sending the first Ethernet packet to the PD, determine the current change rate, where the current change rate is used to indicate a change rate threshold of load power consumption of the PD; and accordingly, the first Ethernet packet further includes the current change rate of the network cable.

The processor 602 is specifically configured to: determine maximum communication bandwidth corresponding to the network cable category of the network cable; and determine a noise voltage threshold of the network cable according to a port rate of the PSE 600, the maximum communication bandwidth, and an output voltage outputted by the PSE chip 601 to the PD.

The PSE chip 601 is further configured to: after outputting the voltage to the PD, adjust a voltage value of the output voltage according to a specified unit time, and measure a noise voltage of the network cable after each voltage adjustment, till a measured noise voltage of the network cable is equal to the noise voltage threshold.

The processor 602 determines a current change rate of the network cable within the specified unit time in a last adjustment process.

Optionally, the noise voltage threshold makes the following formula hold true:

$$U_N = \frac{U_O}{\sqrt{2^{\frac{C}{W}} - 1}}$$

where $U_N$ is the noise voltage threshold, $U_O$ is the output voltage outputted by the PSE chip 601 to the PD, C is the port rate of the PSE, and W is the maximum communication bandwidth.

The PSE 600 may further include a memory configured to store a program and the like. Specifically, the program may include program code, where the program code includes a computer operation instruction. The memory may include a RAM, or may further include a non-volatile memory (non-volatile memory), for example, at least one disk memory. The processor 602 executes the program stored in the memory to implement the foregoing functions, thereby implementing the PoE-based power supply method shown in FIG. 2 and FIG. 4.

By using the PSE provided in this embodiment of the present disclosure, when a line voltage drop between the PSE and a PD is greater than a line voltage drop threshold, the PSE performs power control management for the PD to make the PD decrease load power consumption. In this way, the PD decreases its load, and a value of a required voltage is decreased, so that a voltage supplied by the PSE to the PD can satisfy a power requirement of the PD, which ensures normal working of the PD and avoids occurrence of a power failure.

The PSE may further monitor a network cable temperature in real time. When the network cable temperature reaches a network cable temperature threshold, power control management is also performed for the PD to make the PD decrease load power consumption. In this way, a value of a voltage required by the PD is decreased, ensuring that the network cable temperature is not further deteriorated, and ensuring working reliability of a network cable as well as safety of an entire PoE-based network.

In a process of supplying power to each PD, the PSE sets a current overload threshold according to impedance of each network cable and maximum-load power consumption of the PD. Different current overload thresholds are set for network cables having different impedance. This greatly reduces risks of an overloaded port of the PSE caused by current imbalance among network cables which further leads to power-off of a PD, ensuring working reliability of the PD.

Before instructing the PD to decrease load power consumption, the PSE determines a change rate threshold of load power consumption of the PD, so that when the PD adjusts load power consumption, an actual change rate of load power consumption is less than the change rate threshold of load power consumption. This ensures that a link rate is equal to a port rate of the PSE, and that no service packet loss occurs during data transmission between the PSE and the PD, thereby ensuring transmission reliability of a link.

To sum up, according to the PoE-based power supply method and the PSE provided in the embodiments of the present disclosure, when a line voltage drop across a network cable between PSE and a PD is greater than a line voltage drop threshold, the PSE performs power control management for the PD to make the PD decrease load power consumption. In this way, the PD decreases its load, and a value of a required voltage is decreased, so that a voltage supplied by the PSE to the PD can satisfy a power requirement of the PD, which ensures normal working of the PD and avoids occurrence of a power failure. The PSE may further monitor a network cable temperature in real time. When the network cable temperature reaches a network cable temperature threshold, power control management is also performed for the PD to make the PD decrease load power consumption. In this way, a value of a voltage required by the PD is decreased, ensuring that the network cable temperature is not further deteriorated, and ensuring working reliability of a network cable as well as safety of an entire PoE-based network. In a process of supplying power to each PD, the PSE sets a current overload threshold according to impedance of each network cable and maximum-load power consumption of the PD. Different current overload thresholds are set for network cables having different impedance. This greatly reduces risks of an overloaded port of the PSE caused by current imbalance among network cables which further leads to power-off of a PD, ensuring working reliability of the PD. Before instructing the PD to decrease load power consumption, the PSE determines a change rate threshold of load power consumption of the PD, so that when the PD adjusts load power consumption, an actual change rate of load power consumption is less than the change rate threshold of load power consumption. This ensures that a link rate is equal to a port rate of the PSE, and that no service packet loss occurs during data transmission between the PSE and the PD, thereby ensuring transmission reliability of a link.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer non-volatile storage media (including but not limited to a disk memory, a compact disc ROM (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, a person skilled in the art can make various modifications and variations to embodiments of the present disclosure without departing from the scope of the embodiments of the present disclosure. The present disclosure is intended to cover these modifications and variations provided that they fall within the scope of protection defined by the following claims and their equivalent technologies.

What is claimed is:

1. A Power over Ethernet (PoE)-based power supply method implemented by a power sourcing equipment (PSE), the method comprising:
   determining, before supplying power to a powered device (PD), an impedance of a network cable between the PSE and the PD;
   determining a current in the network cable after supplying power to the PD;
   using a product of the current and the impedance as a line voltage drop across the network cable; and
   sending a first Ethernet packet to the PD when the line voltage drop is greater than a line voltage drop threshold, wherein the first Ethernet packet comprises a first instruction for instructing the PD to decrease a load power consumption.

2. The method of claim 1, wherein the determining the impedance comprises:
   determining a length of the network cable;
   determining a category of the network cable by:
      determining a first correspondence between output powers and signal-to-noise ratios (SNRs) of the network cable; and
      determining the category according to correspondences between output powers and SNRs of various network cable categories on one hand and the first correspondence on another hand;
   determining, according to the category, an impedance per unit length corresponding to the category; and
   using a product of the impedance per unit length and the length as the impedance of the network cable.

3. The method of claim 2, wherein before sending the first Ethernet packet to the PD, the method further comprises determining a current change rate of the network cable, wherein the current change rate indicates a change rate threshold of the load power consumption, wherein the first Ethernet packet further comprises the current change rate.

4. The method of claim 3, wherein the determining the current change rate comprises:
   determining a maximum communication bandwidth corresponding to the network cable category;
   determining a noise voltage threshold of the network cable according to a port rate of the PSE, the maximum communication bandwidth, and an output voltage outputted by the PSE to the PD;
   adjusting, after the PSE outputs the output voltage to the PD, a voltage value of the output voltage according to a specified unit time;
   measuring, after the PSE outputs the output voltage to the PD, a noise voltage of the network cable after each voltage adjustment, till until a measured noise voltage of the network cable is equal to the noise voltage threshold; and
   determining a current change rate of the network cable within the specified unit time in a last adjustment process.

5. The method of claim 4, wherein the noise voltage threshold makes the following formula hold true:

$$U_N = \frac{U_O}{\sqrt{2^{\frac{C}{W}} - 1}}$$

wherein $U_N$ is the noise voltage threshold, $U_O$ is the output voltage, C is the port rate, and W is the maximum communication bandwidth.

6. The method of claim 1, wherein before the PSE supplies the power to the PD, the method further comprises:
   detecting a current load power consumption of the PD;
   classifying the PD according to the current load power consumption to determine a class of the PD;
   determining, according to the class, a maximum-load power consumption of the PD and a maximum output voltage outputted by the PSE to the PD;
   determining a current overload threshold for the network cable according to the maximum-load power consumption of the PD, the impedance of the network cable, and the maximum output voltage; and
   using the current overload threshold to control a power supply for the PD.

7. The method of claim 1, further comprising:
sending a first voltage impulse to the PD;
detecting a second voltage impulse received by the PD;
determining a network cable insertion loss of the network cable according to the first voltage impulse and the second voltage impulse;
determining, according to a correspondence between insertion losses and temperatures, a network cable temperature corresponding to the network cable insertion loss; and
sending a second Ethernet packet to the PD when the network cable temperature is greater than a network cable temperature threshold, wherein the second Ethernet packet comprises a second instruction instructing the PD to decrease the load power consumption.

8. A power sourcing equipment (PSE) comprising:
a PSE chip configured to supply power to a powered device (PD) and determine, after the PSE chip supplies power to the PD, a current in a network cable between the PSE and the PD; and
a processor coupled to the PSE chip and configured to:
determine an impedance of the network cable before the PSE chip supplies power to the PD;
use a product of the current and the impedance as a line voltage drop across the network cable; and
send a first Ethernet packet to the PD when the line voltage drop across the network cable is greater than a line voltage drop threshold, wherein the first Ethernet packet comprises an instruction for instructing the PD to decrease a load power consumption.

9. The PSE of claim 8, wherein the processor is further configured to:
determine a network cable category of the network cable by:
determining a first correspondence between output powers and signal-to-noise ratios (SNRs) of the network cable; and
determining the category according to correspondences between output powers and SNRs of various network cable categories on one hand and the first correspondence on another hand;
determine, according to the category, an impedance per unit length corresponding to the category; and
use a product of the impedance per unit length and the length as the impedance of the network cable.

10. The PSE of claim 9, wherein the PSE chip is further configured to:
determine the length; and
detect and obtain the SNRs of the network cable under the output powers.

11. The PSE of claim 10, wherein before sending the first Ethernet packet to the PD, the processor is further configured to determine a current change rate of the network cable, wherein the current change rate indicates a change rate threshold of the load power consumption, and wherein the first Ethernet packet further comprises the current change rate.

12. The PSE of claim 11, wherein the processor is further configured to:
determine a maximum communication bandwidth corresponding to the network cable category; and
determine a noise voltage threshold of the network cable according to a port rate of the PSE, the maximum communication bandwidth, and an output voltage outputted by the PSE to the PD,
wherein the PSE chip is further configured to:
adjust, after outputting the output voltage to the PD, a voltage value of the output voltage according to a specified unit time; and
measure, after outputting the output voltage to the PD, a noise voltage of the network cable after each voltage adjustment until a measured noise voltage of the network cable is equal to the noise voltage threshold, and
wherein the processor is further configured to determine a current change rate of the network cable within the specified unit time in a last adjustment process.

13. The PSE of claim 12, wherein the noise voltage threshold makes the following formula hold true:

$$U_N = \frac{U_O}{\sqrt{2^{\frac{C}{W}} - 1}}$$

wherein $U_N$ is the noise voltage threshold, $U_O$ is the output voltage, C is the port rate, and W is the maximum communication bandwidth.

14. The PSE of claim 8, wherein the PSE chip is further configured to, before the PSE chip supplies the power to the PD, detect a current load power consumption of the PD, and wherein the processor is further configured to:
classify the PD according to the current load power consumption to determine a class of the PD;
determine, according to the class, a maximum-load power consumption of the PD and a maximum output voltage outputted by the PSE chip to the PD; and
determine a current overload threshold for the network cable according to the maximum-load power consumption of the PD, the impedance of the network cable, and the maximum output voltage,
wherein the PSE is configured to use the current overload threshold to control a power supply for the PD.

15. The PSE of claim 8, wherein the PSE chip is further configured to:
send a first voltage impulse to the PD; and
detect a second voltage impulse received by the PD,
wherein the processor is further configured to:
determine a network cable insertion loss of the network cable according to the first voltage impulse and the second voltage impulse;
determine, according to a correspondence between insertion losses and temperatures, a network cable temperature corresponding to the network cable insertion loss; and
send a second Ethernet packet to the PD when the network cable temperature is greater than a network cable temperature threshold, wherein the second Ethernet packet comprises an instruction instructing the PD to decrease the load power consumption.

16. A powered device (PD), comprising:
a PD chip configured to receive power supplied by a power sourcing equipment (PSE), wherein the PD connects the PSE through a network cable; and
a processor coupled to the PD chip and configured to:
receive an Ethernet packet from the PSE when a line voltage drop across the network cable is greater than a line voltage drop threshold, wherein the Ethernet packet comprises an instruction for instructing the PD to decrease a load power consumption of the PD, wherein the line voltage drop is a product of a current in the network cable and an impedance of the network cable; and
decrease load power consumption of the PD according to the instruction in the Ethernet packet.

17. The PD of claim 16, wherein decreasing the load power consumption comprises shutting down a power source for a module that is idle or undergoes no data transmission.

18. The PD of claim 16, wherein the Ethernet packet further comprises cause information comprising one of:
- a first indication that a line voltage drop across the network cable is greater than a line voltage drop threshold; and
- a second indication that a network cable temperature of the network cable is greater than a network cable temperature threshold.

19. The PD of claim 16, wherein the Ethernet packet further comprises a current change rate, and wherein the processor is configured to ensure a change rate of the load power consumption within a unit time is less than the current change rate when decreasing load power consumption of the PD.

20. A Power over Ethernet (PoE)-based power supply system, comprising:
- a powered device (PD); and
- a power sourcing equipment (PSE) coupled to the PD using a network cable, and supplying power to the PD, wherein the PSE is configured to:
  - determine an impedance of the network cable before supplying power to the PD;
  - determine a current in the network cable after supplying power to the PD;
  - use a product of the current and the impedance as a line voltage drop across the network cable; and
  - send a first Ethernet packet to the PD when the line voltage drop across the network cable is greater than a line voltage drop threshold, wherein the first Ethernet packet comprises an instruction for instructing the PD to decrease a load power consumption, and
- wherein the PD is configured to:
  - receive the first Ethernet packet from the PSE; and
  - decrease load power consumption according to the instruction in the first Ethernet packet.

21. The PoE-based power supply system of claim 20, wherein the PSE is further configured to determine a current change rate of the network cable, wherein the current change rate indicates a change rate threshold of the load power consumption, wherein the first Ethernet packet further comprises the current change rate, and wherein the PD is configured to ensure a change rate of the load power consumption within a unit time is less than the current change rate when decreasing load power consumption of the PD.

* * * * *

UNITED STATES PATENT AND TRADEMARK OFFICE
CERTIFICATE OF CORRECTION

PATENT NO. : 10,027,494 B2
APPLICATION NO. : 15/362910
DATED : July 17, 2018
INVENTOR(S) : Chuanfeng Yang Page 1 of 1

It is certified that error appears in the above-identified patent and that said Letters Patent is hereby corrected as shown below:

On the Title Page

Item (30), Line 1: "201510863963" should be "201510863963.9"

In the Claims

Column 24, Line 38 Claim 4: delete "till"

Signed and Sealed this
Twenty-eighth Day of August, 2018

Andrei Iancu
*Director of the United States Patent and Trademark Office*